US012582964B2

(12) United States Patent
Liu et al.

(10) Patent No.: US 12,582,964 B2
(45) Date of Patent: Mar. 24, 2026

(54) PURIFICATION OF AMINES BY ADSORPTION USING A SUPER ADSORBENT

(71) Applicant: Dow Global Technologies LLC, Midland, MI (US)

(72) Inventors: Yujun Liu, Pearland, TX (US); Xue Chen, Manvel, TX (US); Stephen W. King, Braselton, GA (US); Towhid Hasan, Midland, MI (US); Jerrod Ruddick, Pearland, TX (US); James York, Fulshear, TX (US); Amarnath Singh, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 410 days.

(21) Appl. No.: 18/260,872

(22) PCT Filed: Mar. 21, 2022

(86) PCT No.: PCT/US2022/021082
§ 371 (c)(1),
(2) Date: Jul. 10, 2023

(87) PCT Pub. No.: WO2022/203986
PCT Pub. Date: Sep. 29, 2022

(65) Prior Publication Data
US 2024/0066499 A1     Feb. 29, 2024

Related U.S. Application Data

(60) Provisional application No. 63/164,853, filed on Mar. 23, 2021.

(51) Int. Cl.
| | |
|---|---|
| *B01J 20/26* | (2006.01) |
| *B01J 20/10* | (2006.01) |
| *B01J 20/281* | (2006.01) |
| *B01J 20/34* | (2006.01) |

(52) U.S. Cl.
CPC ........... *B01J 20/262* (2013.01); *B01J 20/103* (2013.01); *B01J 20/281* (2013.01); *B01J 20/34* (2013.01); *B01J 2220/56* (2013.01); *B01J 2220/60* (2013.01)

(58) Field of Classification Search
CPC ...... B01J 20/262; B01J 20/103; B01J 20/281; B01J 20/34; B01J 2220/56; B01J 2220/60
See application file for complete search history.

(56) References Cited

U.S. PATENT DOCUMENTS

| | | | | |
|---|---|---|---|---|
| 4,305,827 A | * | 12/1981 | Sasaki | C01D 3/16 |
| | | | | 502/437 |
| 6,534,681 B1 | | 3/2003 | Watzenberger et al. | |
| 10,196,426 B1 | | 2/2019 | Zhang et al. | |

| | | | | |
|---|---|---|---|---|
| 2018/0100065 A1 | * | 4/2018 | Gray | C07F 7/0812 |
| 2021/0016246 A1 | | 1/2021 | Gray et al. | |
| 2021/0017047 A1 | | 1/2021 | Kail et al. | |

FOREIGN PATENT DOCUMENTS

| | | |
|---|---|---|
| CN | 103102279 | 5/2013 |
| CN | 106178591 | 12/2016 |
| CN | 110590567 | 12/2019 |
| JP | 2003124173 | 4/2003 |
| WO | 2015138940 | 9/2015 |
| WO | 2018071730 | 4/2018 |

OTHER PUBLICATIONS

Wang, Qiuming, et al. "Novel polyethylenimine-acrylamide/SiO2 hybrid hydrogel sorbent for rare-earth-element recycling from aqueous sources." ACS Sustainable Chemistry & Engineering 5.11 (2017): 10947-10958.*
Wilfong, Walter Christopher, et al. "Novel rapid screening of basic immobilized amine sorbent/catalyst water stability by a UV/Vis/Cu2+ technique." ChemSusChem 11.23 (2018): 4114-4122.*
Addala, "Adsorption of Cd and Pb metal ions onto chelating resin and their application in removal of lead from battery factory wastewaters", Indian Journal of Chemical Technology, 2017, vol. 24, pp. 601-607.
Beatty, "A Comparative Study of the Removal of Heavy Metal Ions from Water Using a Silica-Polyamine Composite and a Polystyrene Chelator Resin", Ind. Eng. Chem. Res., 1999, vol. 38, pp. 4402-4408.
Edathil, Amine contaminants removal using alginate clay hybrid composites and its effect on foaming, International Journal of Industrial Chemistry, 2019, vol. 10, pp. 145-158.
Pal, Adsorptive removal of heat stable salt anions from industrial lean amine solvent using anion exchange resins from gas sweetening unit, Journal of Natural Gas Science and Engineering, 2013, vol. 15, pp. 14-21.
Pal, Comparison of heavy metal ions removal from industrial lean amine solvent using ion exchange resins and sand coated with chitosan, Journal of Natural Gas Science and Engineering, 2014, vol. 18, pp. 227-236.
Pal, Contaminates in industrial lean amine solvent and their removal using biopolymers: a new aspect, J Phys Chem Biophys, 2014, vol. 4, No. 1, pp. 1-5.
Pal, Removal of contaminants from industrial lean amine solvent using polyacrylamide hydrogels optimized by response surface methodology, Adsorpt Sci Technol 2015, vol. 33, No. 1, pp. 9-24.
Wang, Amine Sorbents for Selective Recovery of Heavy Rare-Earth Elements (Dysprosium, Ytterbium) from Aqueous Solution, ChemPlusChem, 2020, vol. 85, pp. 130-136.
Wang, Novel Polyethylenmeimine-Acrylamide/SiO2 Hybrid Hydrogel Sorbent for Rare-Earth-Element Recycling from Aqueous Sources, ACS Sustainable Chemistry & Engineering, 2017, pp. 1-33.
Wilfong, Recovering Rare Earth Elements from Aqueous Solution with Porous Amine-Epoxy Networks, ACS Applied Materials & Interfaces, 2017, vol. 9, pp. 18283-18294.

(Continued)

*Primary Examiner* — Richard M Rump

(57) ABSTRACT

The present invention describes a method to remove metals present in a mixture comprising one or more organic amines comprising the step of contacting the mixture with a silica-polyethyleneimine adsorbent.

18 Claims, No Drawings

(56)          References Cited

OTHER PUBLICATIONS

Wilfong, Stable Immobilized Amine Sorbents for Heavy Metal and REE Removal from Industrial Wastewaters, Environmental Science: Water Research & Technology, 2020, vol. 6, pp. 1286-1299.
PCT/US2022/021082 International Search Report and Written Opinion with a mailing date of Jul. 8, 2022.
Ghoul, "Uptake of Heavy Metals from Synthetic Aqueous Solutions Using Modified PEI-Silica Gels", Water Research 2003, vol. 37 No. 4, pp. 959-966.

* cited by examiner

PURIFICATION OF AMINES BY ADSORPTION USING A SUPER ADSORBENT

For many applications, such as electronic and pharmaceutical production processes, high purity amines are desired. In some applications it is desired to have metal ion impurities less than 10 parts per billion. However, processes for removing metal ions from organic solutions such as amines are rarely reported. Rather, most available literature is typically focused on removing metal ions from aqueous solutions. The use of ion exchange resins are the most commonly investigated process for removing metal ions, including the use of chelating resins with different functional groups. However, it is a challenge to use such technology for removing metal ions from amine solutions due to the strong bonding affinity between metal ions and amines or the incompatibility issues between such resins and amines.

This invention discloses the utilization of a special class of super adsorbent to remove trace metal impurities from amines. This adsorbent is based on silica particles modified with branched polyethyleneimenes. The method described provides high adsorption capacities to most of the metal impurities present in the organic amines.

DETAILED DESCRIPTION OF THE INVENTION

The present invention describes a method to remove metals present in a mixture comprising one or more organic amines comprising the step of contacting the mixture with a silica-polyethyleneimine adsorbent.

Theoretically, any solution of amines with metal ion impurities could benefit from the present invention, as all have amine functional groups which make metal removal problematic with most technologies commonly used for the removal of metal impurities. The amine(s) can be an alkylamine and/or an aromatic amine. The amine(s) can be a primary amine, a secondary amine, a tertiary amine, a cyclic amine, or combinations thereof. This includes monoethanolamine (MEA), diethanolamine (DEA), triehanolamine (TEA), monoisropanolamine (MIPA), diisopropanolamine (DIPA), triisopropanolamine (TIPA), n-methyldiethanolamine (MDEA), n-methylethanolamine (NMEA), ethylenediamine (EDA), piperazine (PIP), diethylenetriamine (DETA), aminoethylethanolamine (AEEA), aminoethylpiperazine (AEP), triethylenetetramine (TETA), tetraethylenepentamine (TEPA), dimethylethanolamine (DMEA), polyethylene polyamines, and pentaethylenehexamine mixtures.

These amine materials can be neat or contained in a mixture with two or more of these materials, on their own or in a solvent. The solvent can be water or any organic solvent (and combinations thereof) which is compatible with the amines. The organic solvent can advantageously be an alcohol, benzene or an ether.

The method involves the step of contacting a pure amine or an amine mixture with a silica-polyethyleneimine adsorbent. Suitable silica-polyethyleneimin adsorbents are described in the following references: US 2021/0016246 A1; US2021/0017047; "Novel Polyethylenmeimine-Acrylamide/SiO₂ Hybrid Hydrogel Sorbent for Rare-Earth-Element Recycling from Aqueous Sources", by Qiuming Wang, Walter C. Wilfong, Brian W. Kail, Yang Yu, and McMahan L. Gray, "ACS Sustainable Chemistry & Engineering", Sep. 14, 2017; "Recovering Rare Earth Elements from Aqueous Solution with Porous Amine-Epoxy Networks", Walter Christopher Wilfong, Brian W. Kail, Tracy L. Bank, Bret H. Howard and McMahan L. Gray, "ACS Applied Materials & Interfaces", May 12, 2017; "Amine Sorbents for Selective Recovery of Heavy Rare-Earth Elements (Dysprosium, Ytterbium) from Aqueous Solution", Qiuming Wang, Brian W. Kail, Walter C. Wilfong, Fan Shi, Thomas J. Tarka, and McMahan L. Gray, "ChemPlusChem", 2020, 85 130-136; and "Stable Immobilized Amine Sorbents for Heavy Metal and REE Removal from Industrial Wastewaters", Walter Christopher Wilfong, Brian w. Kail, Qiuming Wang, Fan Shi, Greg Shipley, Thomas J. Tarka and McMahan L. Gray, "Environ. Sci.: Water Res. Technol.", 2020, 6, 1286.

The silica-polyethyleneimine adsorbent is a polyethyleneimine-modified silica particle, which comprises a silica support, a cross-linker bound to the silica support and a polyethyleneimine bound to the cross-linker. The polyethyleimine can be linear, branched or dendrimeric in form. Preferably, the polyethyleneimine is in a branched or dendrimetric form. It is theorized that the imine functionality has more affinity to the metal ions than amines and that highly branched materials will have different types and potentially more functional groups and therefore even more affinity to the metal ions. The linear polyethyleneimines contain all secondary amines. The branched polyethyleneimines may contain primary, secondary and tertiary amino groups. The dentrimetric polyethyleneimines contain primary and tertiary amino groups. The weight molecular weight of polyethyleneimine ranges from 500 Da, preferably 800 Da, 5,000 Da or even 10,000 Da up to 50,000 Da, 75,000 Da, 90,000 Da or even 1,000,000 Da.

The silica-polyethyleneimine-modfied silica support can preferably be made using a crosslinker as is generally known in the art. The crosslinker may comprise an epoxysilane linker, a tri-epoxide linker, or an acrylamide-based linker. Preferred crosslinkers includes 2-(3,4-epoxycyclohexyl) ethyltrimethoxysilane(ECTMS), bisphenyl A diglycidyl ether, N—N-diglycidyl-4-glycidyloxyanaline (E3), or 4,4'-methylenebis (N, N-digly cidylaniline), acrylamide, N, N'-methylene bisacrylamide, or mixtures thereof.

The silica-polyethyleneimine adsorbent can be brought into contact with the amine-containing mixture in any suitable manner. For example, it can be done in a batch process where the silica-polyethyleneimine adsorbent is added to the amine-containing mixture, preferably accompanied by stirring, shaking, or some other process to increase the contact between the adsorbent and the metal impurities in the amines. In general, the rate of removal of impurities and the resulting level of impurities remaining in the amine-containing mixture in such a batch process will be a function of the efficacy of the particular adsorbent, the amount of adsorbent in relation to the amount of amine-containing mixture, the stirring rate, and the time over with the contacting is allowed to continue, as would be understood by one of ordinary skill in the art.

It is also possible to have a continuous process to bring the amines or amine-containing mixture in contact with the adsorbent. This can conveniently done by passing the amine-containing mixture through a fixed bed of silica-polyethyleneimine adsorbent. The bed volume (or BV) can be configured according to the level of contaminant present in the starting material and the desired purity level of the final product, with larger bed volumes generally capable of larger amount of removal in shorter periods of time.

The efficiency of impurity removal from fixed beds is also a function of flow rate of the mixture through the fixed bed. The flow rate of the mixture through the bed can advantageously be adjusted to be in a range from 1 to 30 BV per hour, more preferably in a range of from 1 to 10 BV per hour, where BV is the volume of the bed. For example, if the bed volume of adsorbent is 1 liter, then the flow rate can advantageously be set at a rate of from 1 to 30 liters pet hour, more preferably in a range of from 1 to 10 liters per hour. As will be appreciated by those of ordinary skill in the art, slower flow rates result in more impurities being removed for a given system, but adds time to the process.

In some embodiments the mixture can be passed through two or more fixed beds of silica-polyethyleneimine adsorbent. Those additional beds can be arranged in parallel or in series, or if at least three beds are used, a combination of the parallel and series configurations.

The process of contacting the amine-containing mixture with the silica-polyethyleneimine adsorbent (whether in a batch or continuous process) can be done at any temperature ranging from the freezing point of the mixture to just below the boiling point of the mixture.

The silica-polyethyleneimine adsorbent can advantageously be washed with water or other solvents prior to contacting the mixture to remove possible contaminant impurities from the adsorbent material and therefore prolong the life and improve the metal removal efficiency of the adsorbent. Preferably this washing can be done two or more times in order to remove even more contaminant impurities from the fresh adsorbent.

During use, the metal impurities removed from the amines will build up on the adsorbent over time. Accordingly it may be desirable to periodically regenerate the adsorbent. This can be conveniently achieved by contacting the the absorbent with a weak acid liquid or a weak acid aqueous solution at any temperature ranging from the freezing point of the liquid to just below the boiling point of the liquid. A weak acid is an acid that partially dissociates into its ions in an aqueous solution or water. For instance, the weak acid include acetic acid, formic acid, hydrocyanic acid, hydrofluoric acid, hydrogen sulfide, trichloracetic acid or a mixture thereof. The pH of such weak acid liquid or weak acid aqueous solution ranges from 2 to 7. It may also be possible to regenerate the adsorbent using other materials to which the metal ions have a higher affinity, such as ammonia which is a stronger amine (as compared to the adsorbent).

The process of the present invention can be used to reduce the metal impurity level in the amine-containing mixture to levels of metal contaminant less than 10 ppb, or even less than 5 ppb.

EXPERIMENTAL

Materials: An unwashed branched polyethyleneimine-modified silica adsorbent was used as the adsorbent for each of the following examples. The adsorbent is of the sort described in the following references: US 2021/0016246 A1; US2021/0017047; "Novel Polyethylenmeimine-Acrylamide/SiO$_2$ Hybrid Hydrogel Sorbent for Rare-Earth-Element Recycling from Aqueous Sources", by Qiuming Wang, Walter C. Wilfong, Brian W. Kail, Yang Yu, and McMahan L. Gray, "ACS Sustainable Chemistry & Engineering", Sep. 14, 2017; "Recovering Rare Earth Elements from Aqueous Solution with Porous Amine-Epoxy Networks", Walter Christopher Wilfong, Brian W. Kail, Tracy L. Bank, Bret H. Howard and McMahan L. Gray, "ACS Applied Materials & Interfaces", May 12, 2017; "Amine Sorbents for Selective Recovery of Heavy Rare-Earth Elements (Dysprosium, Ytterbium) from Aqueous Solution", Qiuming Wang, Brian W. Kail, Walter C. Wilfong, Fan Shi, Thomas J. Tarka, and McMahan L. Gray, "ChemPlusChem", 2020, 85 130-136; and "Stable Immobilized Amine Sorbents for Heavy Metal and REE Removal from Industrial Wastewaters", Walter Christopher Wilfong, Brian w. Kail, Qiuming Wang, Fan Shi, Greg Shipley, Thomas J. Tarka and McMahan L. Gray, "Environ. Sci.: Water Res. Technol.", 2020, 6, 1286. A sample of n-methylethanolamine (NMEA) (commercially available from the Dow Chemical Company, >99% NMEA pure amine liquid) is used as the target amine liquid to be purified for each of these examples.

The metal concentration analysis is conducted by ICP-MS. The Agilent 7900x ICP-MS instrument is equipped with inert polytetrafluoroethylene (PFA) micro flow nebulizer, a PFA spray chamber, and a quartz sample introduction system, in order to eliminate interference from the organic matrix, carrying gas, etc. The 7900 ICP-MS instrument is equipped with an Octopole Reaction Cell (ORC), He and H$_2$ cell gas lines. This system can remove polyatomic interferences with collision/reaction cell (CRC) technology. The ICP-MS instrument is an ISO Class 100 clean room equipped with an ISO Class 100 clean hood. The sample preparation, including weighing, digestion and analysis, are done following clean chemistry. The analyses are performed on an Agilent 7900x ICP-MS. The instrument is equipped with a 200-µL self-aspirating PFA Micro Flow nebulizer, a PFA spray chamber with a 1.5 mm inner diameter injector and platinum interface (sampler cone and skimmer cone). In order to reach a high sensitivity and low background and to reduce any polyatomic interferences, the ICP-MS instrument is tuned with 1 ppb tuning solution under no gas, H$_2$ reaction, and helium collision mode.

The chemicals and reagents used for the ICP-MS analysis include: nitric acid, multi-element standards and ICP-MS tuning solution. Nitric acid is Ultra-Trace Metal grade or Optima grade. They are used for samples digestion and for making calibration standards and tuning solution. The instrument is tuned and calibrated under mode of N$_2$ gas, H$_2$ gas and He gas. The instrument is calibrated over the range of 0-10 ng/mL using 0, 0.25, 1, 5 and 10 ng/mL calibration standards (SPEX CertiPrep, Multi-element Standards) made up in 5% nitric acid.

In order to have the metals analyzed by ICP-MS, organics in the amine samples need be eliminated. This usually can be executed by evaporating to dryness at sub-boiling temperature in a hot block with nitrogen purge. The residue is then re-dissolved in nitric acid and diluted with water. The prepared solutions are analyzed using inductively coupled plasma-mass spectrometry (ICP-MS) using the Agilent 7900 ICP-MS as described above.

Example 1: Batch Method

As shown in Table 1, five different amounts of the same adsorbent are added into five plastic bottles respectively. Approximately the same amount of NMEA is added into each bottle. After addition of the NMEA solution, the five bottles are placed on a mechanical shaker for overnight shaking to expedite the adsorption equilibrium. After shaking, the adsorbent is allowed to settle down in the bottles and liquid samples are taken for metal analysis. The original untreated NMEA samples are also analyzed for metal contents as the control.

Table 1 shows the experimental results. As shown in this Table, the original NMEA control sample has Fe, Cu and Zn ions at the concentration of 97, 9, 47 ppb respectively. For tests 1 to 5, the NMEA amine liquid amount is almost the same, the adsorbent dosage for each test is increased from test 1 to 5. Table one demonstrates that the more adsorbent applied, the more metal ions are removed from liquid NMEA. For example, for Fe$^{3+}$ metal ions, in test 5, after applying 0.816 grams of adsorbent, only 4 ppb Fe$^{3+}$ was left in the NMEA. For another example, for Zn$^{2+}$, after even only 0.405 grams of adsorbent was applied in test 4, only 3 ppb Zn$^{2+}$ was left in NMEA at equilibrium. For a 3$^{rd}$ example, for Cu$^{2+}$, after 0.816 grams of adsorbent was applied in test 5, 2 ppb Cu$^{2+}$ was left in NMEA at equilibrium.

As can be seen, when properly designed, an adsorber utilizing this class of adsorbents can provide over 95% removal efficiency for the major metal contaminants, such as Fe and Zn, with good operation life.

TABLE 1

Metal concentrations in tests with different amount of NETL adsorbent

|  | Unit | Contorl (Origianl NMEA) | Test 1 | Test 2 | Test 3 | Test 4 | Test 5 |
|---|---|---|---|---|---|---|---|
| Adsorbent Media | g |  | 0.037 | 0.087 | 0.193 | 0.405 | 0.816 |
| NMEA | g |  | 36.02 | 35.8 | 37.15 | 36.6 | 36.5 |
| Li | ppb | 0 | 0 | 0 | 0 | 0 | 0 |
| Na | ppb | 14 | 4 | 6 | 2 | 1 | 1 |
| Mg | ppb | 1 | 1 | 1 | 1 | 1 | 1 |
| Al | ppb | 1 | 1 | 2 | 1 | 2 | 2 |
| K | ppb | 2 | 1 | 4 | 1 | 0 | 1 |
| Ca | ppb | 22 | 6 | 13 | 8 | 9 | 9 |
| V | ppb | 0 | 0 | 0 | 0 | 0 | 0 |
| Cr | ppb | 2 | 2 | 2 | 2 | 3 | 4 |
| Mn | ppb | 1 | 1 | 1 | 1 | 0 | 0 |
| Fe | ppb | 97 | 45 | 18 | 8 | 4 | 4 |
| Co | ppb | 0 | 0 | 0 | 0 | 0 | 0 |
| Ni | ppb | 2 | 1 | 1 | 0 | 0 | 0 |
| Cu | ppb | 9 | 3 | 1 | 1 | 2 | 2 |
| Zn | ppb | 47 | 10 | 8 | 5 | 3 | 2 |
| Sr | ppb | 0 | 0 | 0 | 0 | 0 | 0 |
| Zr | ppb | 0 | 0 | 1 | 1 | 1 | 0 |
| Mo | ppb | 0 | 0 | 0 | 0 | 0 | 0 |
| Cd | ppb | 0 | 0 | 0 | 0 | 0 | 0 |
| Sn | ppb | 0 | 0 | 0 | 0 | 1 | 0 |
| Sb | ppb | 0 | 0 | 0 | 0 | 0 | 0 |
| Ba | ppb | 0 | 0 | 0 | 0 | 0 | 0 |
| Pb | ppb | 0 | 0 | 0 | 0 | 1 | 1 |

Example 2: Fixed Bed Adsorption Experiment

The adsorption column was made of polypropylene with polypropylene frit as support for the adsorbent media. The amount of the super adsorbent packed into the column is 0.985 g and the volume of the adsorbent bed is 2.85 mL. NMEA is pumped by a Liquid Chromatography pump procured from Alltech (Model 626). The pump is constructed with metal free PEEK materials. A flow rate of 1.0 ml/min (21 bed volume ("BV") per hour) is maintained throughout the entire time of adsorption experiment. Control samples are collected before and after to ensure absence of contamination from pump fittings and tubes. At regular interval, approximately 1-2 ml of sample are collected at the exit of the column for analytical measurements. The results from this fixed bed adsorption experiment are shown in Table 2.

The fixed bed adsorption results show that essentially all the metal impurities present in the NMEA (control) are adsorbed by the super adsorbent to certain extent. A few fluctuations of the metal concentrations were most likely due to analytical or experimental error. Take $Fe^{3+}$ metal ion as an example, when 140 BV of NMEA was fed through the adsorbent column, $Fe^{3+}$ concentration in the effluent was 26 ppb, down from 84 ppb in the NMEA feed (control). Take $Cu^{2+}$ as another example, when 140 BV of NMEA was fed through the adsorbent column, its concentration in the effluent was 2 ppb, down from 16 ppb in the NMEA feed (control). Take $Zn^{2+}$ as a third example, when 42 BV of NMEA was fed through the adsorbent column, its concentration in the effluent was 3 ppb, down from 158 ppb in the NMEA feed (control). After 42 BV of NMEA was fed into the column, more $Zn^{2+}$ starts to slowly break through the adsorbent bed as evidenced by the slow $Zn^{2+}$ concentration increase as

TABLE 2

Fixed bed adsorption breakthrough experiment - Effluent metal concentrations at different amount of NMEA processed

|  | | Li | Na | Mg | Al | K | Ca | V | Cr | Mn | Fe | Co | Ni | Cu | Zn | As | Sr | Mo | Cd | Sn | Ba | Pb |
|---|---|---|---|---|---|---|---|---|---|---|---|---|---|---|---|---|---|---|---|---|---|---|
| Control | | 0 | 48 | 94 | 20 | 263 | 93 | 0 | 4 | 1 | 84 | 0 | 3 | 16 | 158 | 0 | 0 | 0 | 0 | 0 | 0 | 1 |
| Accumulated | 5 | 0 |  |  |  |  |  | 0 | 4 | 1 | 17 | 0 | 7 | 3 | 55 | 0 |  | 0 | 1 | 1 | 0 | 0 |
| NMEA Fed | 18 | 0 | 96 | 15 | 9 | 153 | 52 | 0 | 3 | 1 | 13 | 0 | 4 | 3 | 9 | 0 | 0 | 0 | 0 | 0 | 0 | 1 |
| through | 21 | 0 |  |  |  |  |  | 0 | 4 | 1 | 16 | 0 | 3 | 3 |  | 0 |  | 0 | 1 | 1 | 0 | 0 |
| Column | 32 | 0 |  |  |  |  |  | 0 | 4 | 1 |  | 0 | 1 | 2 | 10 | 0 |  | 0 | 0 | 1 | 0 | 0 |
| (BV) | 42 | 0 | 29 | 16 | 8 | 114 | 19 | 0 | 3 | 1 | 21 | 0 | 1 | 3 | 3 | 0 | 0 | 0 | 0 | 0 | 0 | 0 |
|  | 53 | 0 |  |  |  |  |  | 0 | 4 | 1 | 24 | 0 | 1 | 3 | 13 | 0 |  | 0 | 0 | 1 | 0 | 0 |
|  | 70 | 0 | 16 | 15 | 9 | 96 | 21 | 0 | 3 | 1 | 23 | 0 | 1 | 3 | 21 | 0 | 0 | 0 | 0 | 0 | 0 | 0 |
|  | 88 | 0 |  |  |  |  |  | 0 | 4 | 1 | 27 | 0 | 1 | 4 | 7 | 0 |  | 0 | 0 | 1 | 0 | 0 |
|  | 105 | 0 | 15 | 16 | 8 | 87 | 17 | 0 | 3 | 1 | 26 | 0 | 1 | 3 | 37 | 0 | 0 | 0 | 0 | 0 | 0 | 0 |
|  | 140 | 0 | 14 | 16 | 9 | 77 | 17 | 0 | 3 | 1 | 26 | 0 | 1 | 2 | 35 | 0 | 0 | 0 | 0 | 0 | 0 | 0 | more NMEA was fed through the column. The super adsorbent has different adsorption capacities to different metals. Therefore, the breakthrough time for each metal in a fixed bed adsorption column will be different. Note that the example results discussed was done at a feed flow rate of 21 BV per hour. When the feed flow rate is lower, particularly in the preferred range of 1-10 BV per hour, the metal removal efficiency will be higher and metal concentrations in the effluent will be lower.

What is claimed is:

1. A method to remove metal ions present in a mixture comprising one or more organic amines comprising the step of contacting the mixture with a silica-polyethyleneimine adsorbent.

2. The claim 1 wherein the polyethyleneimine is a linear, branched, or dentrimer.

3. The method of claim 1 wherein, the metal ions to be removed comprise at least one of Fe, Zn, Cr, Mn, Co, Ni, Cu, Cd, Li, Na, K, Mg, Ca, Sr, Ba, Al, Pb and Sb.

4. The method of claim 1 wherein the organic amines are selected from the group consisting of Monoethanolamine (MEA), Diethanolamine (DEA), Triethanolamine (TEA), Monoisopropanolamine (MIPA), Diisopropanolamine (DIPA), Triisopropanolamine (TIPA), N-Methyldiethanolamine (MDEA), N-Methylethanolamine (NMEA), Ethylenediamine (EDA), Piperazine (PIP), Diethylenetriamine (DETA), Aminoethylethanolamine (AEEA), Aminoethylpiperazine (AEP), Triethylenetetramine (TETA), Tetraethylenepentamine (TEPA), dimethylethanolamine (DMEA), Polyethylene polyamines, Pentaethylenehexamine mixtures, and combinations thereof.

5. The method of claim 1 wherein the mixture is passed through a fixed bed of silica-polyethyleneimine adsorbent.

6. The method of claim 5 wherein the flow rate of the mixture through the bed is in a range from 1 to 30 BV per hour, where BV is the volume of the bed.

7. The method of claim 6 where the flow rate of the mixture through the bed is in a range from 1 to 10 BV per hour.

8. The method of claim 5 wherein the mixture is passed through two or more fixed beds of silica-polyethyleneimine adsorbent, wherein the two or more beds are arranged in parallel, series, or a combination of parallel and series circuits.

9. The method of claim 8 wherein the two or more beds are arranged in parallel circuits.

10. The method of claim 1 where the silica-polyethyleneimine adsorbent is added to the mixture and mixed.

11. The method of claim 1 where the mixture is contacted with the silica-polyethyleneimine adsorbent at a temperature ranging from the freezing point of the mixture to just below the boiling point of the mixture.

12. The method of claim 1 where the silica-polyethyleneimine adsorbent is washed with water or other solvent(s) prior to contacting the mixture.

13. The method of claim 12, where the silica-polyethyleneimine adsorbent is washed with water or other solvent(s) two or more times.

14. The method of claim 1 where the silica-polyethyleneimine adsorbent is periodically regenerated by contacting the the adsorbent with a material to which the metal ions have a higher affinity comprising weak acid, weak acid aqueous solutions, or a comparatively stronger amine a weak acid or a weak acid aqueous solution, or a comparatively stronger amine.

15. The method of claim 14 where the contacting material is a weak acid selected from the group consisting of acetic acid, formic acid, hydrocyanic acid, hydrofluoric acid, hydrogen sulfide, trichloracetic acid, or mixtures thereof.

16. The method of claim 14 where the contacting material is ammonia.

17. The method of claim 7 wherein the volume of the bed is configured to reduce the amount of a particular metal contaminant to a desired level given a desired flow rate.

18. The method of claim 17 where the desired level of metal contaminant is less than 10 ppb.

* * * * *